(12) United States Patent
Lee et al.

(10) Patent No.: US 10,331,704 B2
(45) Date of Patent: Jun. 25, 2019

(54) METHOD FOR PROVIDING SOCIAL MEDIA CONTENT AND ELECTRONIC DEVICE USING THE SAME

(71) Applicant: Samsung Electronics Co., Ltd., Gyeonggi-do (KR)

(72) Inventors: Lyesuk Lee, Gyeonggi-do (KR); Seokho Yoon, Seoul (KR); Haenam Yang, Gyeonggi-do (KR); Wonho Ryu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 14/963,041

(22) Filed: Dec. 8, 2015

(65) Prior Publication Data

US 2016/0162585 A1 Jun. 9, 2016

(30) Foreign Application Priority Data

Dec. 8, 2014 (KR) ........................ 10-2014-0175231

(51) Int. Cl.
*G06F 16/28* (2019.01)
*G06F 16/958* (2019.01)
*G06F 16/955* (2019.01)

(52) U.S. Cl.
CPC .......... *G06F 16/285* (2019.01); *G06F 16/958* (2019.01); *G06F 16/9566* (2019.01)

(58) Field of Classification Search
CPC ........... G06F 17/30864; G06F 17/3086; G06F 17/30067; G06F 17/30598; G06F 17/30887; G06F 17/3089
USPC ............... 707/738, 748, 661, 708, 716, 726; 709/202–204, 212, 217
See application file for complete search history.

(56) References Cited

U.S. PATENT DOCUMENTS

| | | | | |
|---|---|---|---|---|
| 8,171,128 B2* | 5/2012 | Zuckerberg | ............ | G06Q 30/02 709/224 |
| 8,312,140 B2* | 11/2012 | Zuckerberg | ............ | G06Q 30/02 709/224 |
| 8,762,472 B2* | 6/2014 | Weinstein | ............... | G06Q 10/10 709/206 |
| 9,213,471 B2* | 12/2015 | Rose | .................... | G06F 3/04817 |
| 2004/0230651 A1* | 11/2004 | Ivashin | ............. | H04L 29/06027 709/204 |
| 2007/0161382 A1* | 7/2007 | Melinger | ................. | H04L 67/18 455/456.1 |
| 2008/0077574 A1* | 3/2008 | Gross | ................. | G06F 17/30699 |
| 2008/0103907 A1* | 5/2008 | Maislos | .................. | G06Q 10/10 705/14.54 |
| 2009/0048904 A1* | 2/2009 | Newton | .................. | G06Q 10/10 705/7.29 |
| 2009/0119173 A1* | 5/2009 | Parsons | ................ | G06Q 10/107 705/319 |

(Continued)

*Primary Examiner* — Daniel A Kuddus

(57) ABSTRACT

An electronic device, according to various embodiments of the present disclosure, include: a communication module configured to receive a keyword list that includes a topic keyword and one or more related keywords concerning the topic keyword from another electronic device; and a processor configured to create a topic channel by using the keyword list, collect social media data by using the one or more related keywords, extract related content by analyzing the social media data, and provide the social media data and the related content to the other electronic device through the topic channel.

22 Claims, 11 Drawing Sheets

(56) References Cited

U.S. PATENT DOCUMENTS

| | | | |
|---|---|---|---|
| 2011/0055699 A1* | 3/2011 | Li | G06F 16/951 |
| | | | 715/709 |
| 2013/0066884 A1* | 3/2013 | Kast | G06N 5/04 |
| | | | 707/748 |
| 2013/0151240 A1* | 6/2013 | Myslinski | G06F 17/20 |
| | | | 704/9 |
| 2014/0081965 A1 | 3/2014 | Gross | |

* cited by examiner

METHOD FOR PROVIDING SOCIAL MEDIA CONTENT AND ELECTRONIC DEVICE USING THE SAME

CROSS-REFERENCE TO RELATED APPLICATIONS AND CLAIM OF PRIORITY

The present application is related to and claims benefit under 35 U.S.C. § 119(a) of Korean Patent Application No. 10-2014-0175231, filed on Dec. 8, 2014, which is hereby incorporated by reference for all purposes as if fully set forth herein.

TECHNICAL FIELD

Various embodiments of the present disclosure relate to an electronic device for providing social media content, and particularly, to an electronic device for providing topic channels including social media content on the basis of users, and a method for providing the social media content thereof.

BACKGROUND

Social network services (SNS) refer to services by which people may strengthen existing relationships with others and may make more personal connections based on the web. The SNS may provide a service for classifying people into specific groups, a service for providing a means by which the users can contact their friends, or the like. Initial social networks were generalized online communities in which groups or people who are interested in a particular topic sharing exclusive services in which the users get together and chat to each other in chat rooms or the users post personal information or articles on their personal home pages. Afterwards, with the provision of the SNSs that allow the user to share his/her individual interests and personality and that can attract tens of millions of unique service users, the SNSs have been productively used to share business and a variety of information. The SNS may provide a means by which the users can contact each other through e-mails or instant messenger services. The SNS enables a one-person media and a one-person community to help the sharing of personal information and communicate with each other. In addition, since the SNS enables users who have the same interest or social background to make personal connections and exchange information with each other, the SNS users may be provided with highly reliable information.

SUMMARY

To address the above-discussed deficiencies, it is a primary object to provide a method and apparatus for providing social media content, for use in an electronic device.

In the exclusive SNS that makes a social network between acquaintances, since the creation and distribution of new content is limited to the members of the social network, it is difficult to create a variety of content, and the communication range of the created content is limited to the corresponding network.

In addition, in the case of an interest-based social network that is comprised of people who are interested in a particular subject, the user can select the topic of interest only from the categories prepared by a service providing system, and the user may be provided with limited content from the service providing system. Therefore, the user cannot obtain enough content for the topic of interest.

In accordance with an aspect of the present disclosure, an electronic device includes: a communication module configured to receive a keyword list that includes a topic keyword and one or more related keywords concerning the topic keyword from the other electronic device; and a processor configured to create a topic channel by using the keyword list, collect social media data by using the one or more related keywords, extract related content by analyzing the social media data, and provide the social media data and the related content to the other electronic device through the topic channel.

In accordance with another aspect of the present disclosure, a method for providing social media content includes: receiving a keyword list that includes a topic keyword and one or more related keywords concerning the topic keyword from the other electronic device; creating a topic channel by using the keyword list; collecting social media data by using the one or more related keywords; extracting related content by analyzing the social media data; and providing the social media data and the related content to the other electronic device through the topic channel.

The method for providing social media content of an electronic device, according to various embodiments of the present disclosure, may enable: anyone to create a topic channel for a personal interest; and others to retrieve and participate in the created topic channel.

In the method for providing social media content of an electronic device, according to various embodiments of the present disclosure, the SNS user may create a unique topic channel of its own by directly describing various features for the topic of interest instead of selecting the limited category provided from an SNS server, and thus it is possible to define personalized characteristics for the topic of interest.

The method for providing social media content of an electronic device, according to various embodiments of the present disclosure, can collect and analyze existing social media data to then provide analyzed content to the personal topic channel so that the members participating in the topic channel can be provided with a variety of trendy content for the topic channel of interest.

The method for providing social media content of an electronic device, according to various embodiments of the present disclosure, can succeed to the social media data and the related content, which are contained in the topic channel that was created before, and can create a new topic channel. Thus, it is possible to rapidly and simply extend the topic channel to a new topic channel.

In the method for providing social media content of an electronic device, according to various embodiments of the present disclosure, when the feedback is registered in the social media data contained in the topic channel, the registered feedback is forwarded to external social media data corresponding to the corresponding social media data in order to thereby transfer various opinions of the members who participate in the corresponding topic channel to the existing social media.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
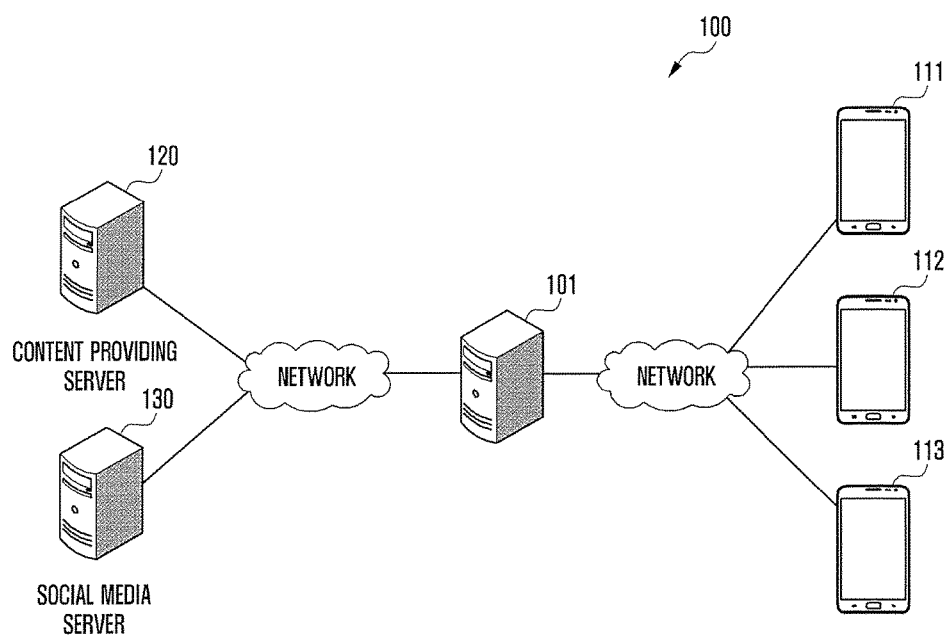
FIG. 1 illustrates a social media content providing system according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Herein, embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to the meanings found in an ordinary dictionary, but are merely used to enable a clear and consistent understanding of the present disclosure. Accordingly, it should be apparent to those skilled in the art that the following description of embodiments of the present disclosure is provided for illustration purposes only and not for the purpose of limiting the present disclosure as defined by the appended claims and their equivalents.

As used herein, the singular forms "a," "an," and "the" are intended to include the plural forms, including "at least one," unless the content clearly indicates otherwise. The term "or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc. is used herein to describe various elements, components, regions, layers and/or sections, these elements, components, regions, layers, and/or sections should not be limited by these terms. These teems are only used to distinguish one element, component, region, layer, or section from another element, component, region, layer, or section. Thus, a first element, component, region, layer, or section could also be referred to as a second element, component, region, layer or section, and vice versa, without departing from the teachings herein.

Herein, an electronic device is a device that involves a communication function. For example, an electronic device is embodied as a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to various embodiments of the present disclosure, an electronic device is a smart home appliance that involves a communication function. For example, an electronic device may be a Television (TV), a Digital Versatile Disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to various embodiments of the present disclosure, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), an Flight Data Recorder (FDR), a car infotainment device, electronic equipment for ship (e.g., a marine navigation system, a gyrocompass, etc.), avionics, security equipment, or an industrial or home robot.

According to various embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are provided as examples only and are not to be considered a limitation of this disclosure.

FIG. 1 illustrates a social media content providing system 100, according to various embodiments of the present disclosure.

The social media content providing system 100 includes an electronic device 101, one or more other electronic devices 111, 112, and 113, a content providing server 120, and a social media server 130.

The content providing server 120, according to various embodiments of the present disclosure, provides related content to the electronic device 101. The content providing server 120 is a portal site server that provides a variety of content. For example, the electronic device 101 accesses a linkage address contained in the social media data and is provided with content, such as news articles, images, or videos, from the content providing server 120.

The social media server 130, according to various embodiments of the present disclosure, provides a social media service, such as TWITTER, FACEBOOK, or the like. The social media server 130 can store social media data that is registered by the users. Meanwhile, the social media service is referred to as a social network service. Hereinafter, it will be referred to as a social media service.

The electronic device 101, according to various embodiments of the present disclosure, receives a keyword list that includes a topic keyword and one or more related keywords that concern the topic keyword from the other electronic device 111. The electronic device 101 creates a topic channel by using the keyword list. The topic channel provides a variety of social media content related to the received topic keyword. For example, when the electronic device 101 receives a topic keyword "sports" from the other electronic device 111, the electronic device 101 creates a topic channel for sports and provides a variety of social media content related to sports through the sport-topic channel.

The social media content includes social media data and related content. The social media data may be posts on social media services, such as TWITTER, FACEBOOK, Me2 day, or the like. The related content may be the content, such as Internet articles, images, or videos, which are included in the social media data, and the related content may be extracted from the social media data, based on a linkage address (URL).

The electronic device 101 collects the social media data by using one or more related keywords received from the other electronic device 111. One or more related keywords include a search keyword or a search-exclusion keyword. The electronic device 101, according to various embodiments of the present disclosure, collects the social media data that includes the search keyword of the one or more related keywords. For example, when the search keywords "soccer," "baseball," and "basketball" are received as related keywords of a topic keyword "sports," the electronic device 101 collect the social media data that includes the keyword "soccer," "baseball," or "basketball." The electronic device 101, according to various embodiments of the present disclosure, collects the social media data that does not contain the search-exclusion keyword of the one or more related keywords. For example, when a search-exclusion keyword "badminton" is received as a related keyword of the topic keyword "sports," the electronic device 101 collects the social media data that does not contain the keyword "badminton." The electronic device 101 stores the collected social media data.

The electronic device 101 analyzes the collected social media data and extracts related content. The electronic device 101 analyzes the social media data in order to thereby identify a linkage address contained in the social media data and accesses the linkage address to extract the related content that concerns the related keyword. For example, when electronic device 101 collects the social media data that includes a related keyword "soccer," the electronic device 101 accesses a linkage address contained in the corresponding social media data, and extracts Internet articles, videos, or images, which are linked to the linkage address. The electronic device 101 stores the extracted related content.

The electronic device 101 provides the collected social media data and the extracted related content to the other electronic devices 111, 112, and 113 through a related topic channel. For example, the electronic device 101 provides the sport-topic channel with the social media data that is collected using the related keyword concerning sports and the related content that is extracted from the social media data. According to various embodiments of the present disclosure, the electronic device 101 provides one or more other electronic devices 111, 112, and 113 with a content list that includes the social media data and the related content concerning the social media data, which are contained in the topic channel. Another electronic device 111 receives the content list from the electronic device 101, and if the social media data or the related content is selected from the content list, the electronic device 111 provides the user with the selected social media data or the selected related content.

Figure 2:
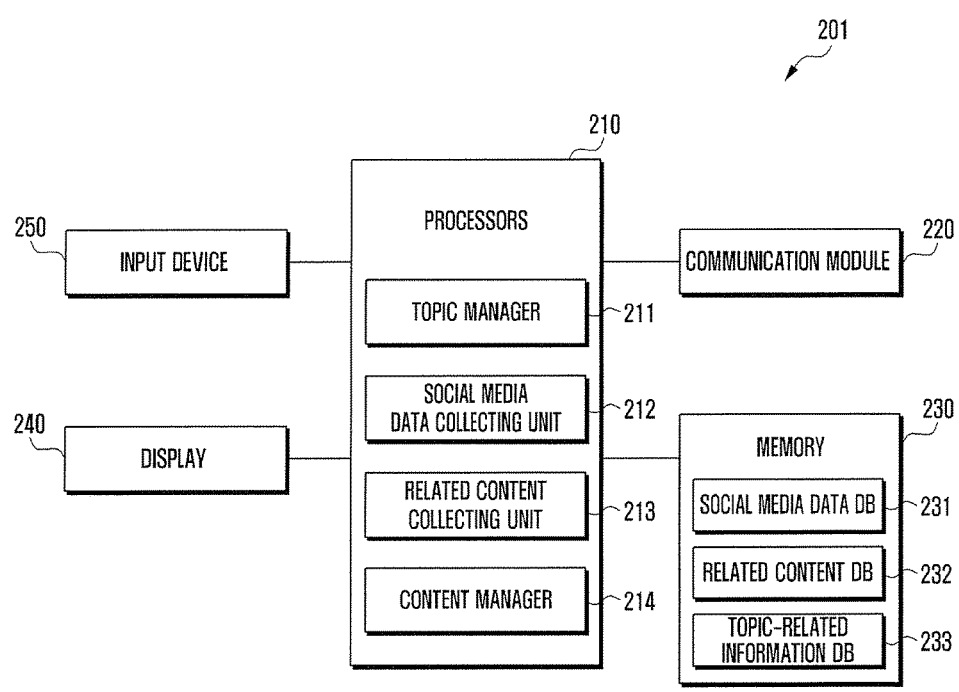
FIG. 2 is a block diagram of an electronic device according to various embodiments of the present disclosure.

FIG. 2 is a block diagram of an electronic device 201, according to various embodiments of the present disclosure. The electronic device 201, for example, includes all or some of the electronic devices 101, 111, 112, or 113 shown in FIG. 1. The electronic device 201 includes one or more processors 210 {e.g., an AP (Application Processor)}, a communication module 220, a memory 230, a display 240, and an input device 250.

The processor 210 includes a topic manager 211, a social media data collecting unit 212, a related content collecting unit 213, and a content manager 214. The processor 210, for example, controls a plurality of hardware or software elements that are connected with the processor 210 by driving an operating system or application programs and performs the processing of various pieces of data and its calculation. The processor 210, for example, is implemented as an SoC (System on Chip). According to various embodiments, the processor 210 further includes a GPU (graphic processing unit) and/or an image signal processor. The processor 210 includes at least some (e.g., a cellular module) of the elements shown in FIG. 2. The processor 210 loads commands or data received from at least one of other elements (e.g., a non-volatile memory) in a volatile memory in order to thereby process the same and stores a variety of data in a non-volatile memory.

According to various embodiments of the present disclosure, the topic manager 211 included in the processor 210 creates a topic channel by using a keyword list that includes a topic keyword and one or more related keywords concerning the topic keyword. The topic manager 211 corrects or deletes the created topic channel. The topic manager 211, according to various embodiments of the present disclosure, creates a topic channel by using a keyword list that includes a basic topic keyword and one or more related keywords. The basic topic keyword means a topic keyword that refers to an existing topic channel that was created before. The topic manager 211 creates a new topic channel based on a basic topic channel that corresponds to the basic topic keyword, and the topic channel that is to be newly created succeeds to the social media data and the related content, which are contained in the existing topic channel (the basic topic channel). The topic manager 211 determines a recommended topic channel by analyzing one or more topic channels. More specifically, the topic manager 211 identifies the number of pieces of the collected social media data and the related content in the topic channel and determines a topic channel that includes a predetermined number of pieces of content or more as the recommended topic channel. For example, if the number of pieces of content to be determined as the recommended topic channel is one hundred, the topic manager 211 determines a specific topic channel, which provides one hundred or more pieces of social media data and related content, to be the recommended topic channel. In addition, the topic manager 211 identifies the number of times by which each topic channel is registered as an interest-topic channel and determines, as the recommended topic channel, a topic channel, of which the number of registration times of the interest-topic channel is equal to or more than a predetermined number of times. For example, when a predetermined number of registration times of the interest-topic channel to be determined as the recommended topic channel is set as thirty times, the topic manager 211 determines a topic channel, which has thirty or more registration times of the interest-topic channel, to be the recommended topic channel. The topic manager 211 provides the determined recommended topic channel to other electronic devices.

According to various embodiments of the present disclosure, the social media data collecting unit 212 included in the processor 210 collects social media data by using one or more related keywords. More specifically, the social media data collecting unit 212 collects social media data by using a search keyword and a search-exclusion keyword, which are contained in one or more related keywords. The social media data collecting unit 212 collects social media data that includes the search keyword of one or more related keywords. The social media data collecting unit 212 collects social media data that does not include the search-exclusion keyword of one or more related keywords. The social media data collecting unit 212, according to various embodiments of the present disclosure, accesses the social media server 130 in order to thereby directly collect the social media data related to the related keyword. In another embodiment, the social media data collecting unit 212 stores all of the social media data that is provided in the social media server 130 in the memory 230 and collects the social media data concerning the related keyword from all of the stored social media data by a crawling technology. In order to store all of the social media data, the social media data collecting unit 212 uses an API (Application Programming Interface) that is provided by a social media service. In addition, in order to store all of the social media data, the social media data collecting unit 212 includes an affiliation with the social media server 130 and performs DB-backup or DB-dump from a DB of the social media server 130. According to various embodiments of the present disclosure, the social media data collecting unit 212 collects social media data by using a basic topic keyword and one or more related keywords. More specifically, a created topic channel succeeds to the social media data of a topic channel that corresponds to the basic topic keyword.

According to various embodiments of the present disclosure, the related content collecting unit 213 included in the processor 210 analyzes the collected social media data in order to thereby extract related content. The related content refers to Internet articles, images and videos, which are contained in the social media data, and the related content are extracted from the social media data based on a linkage address (URL). The related content collecting unit 213, according to various embodiments of the present disclosure, extracts linkage address (URL: Uniform Resource Location) information from the collected social media data, and restores the linkage address. The related content collecting unit 213 identifies whether or not the restored linkage address is appropriate. More specifically, the electronic device 201 identifies whether or not the restored linkage address is a linkage address that has been previously analyzed. If the restored linkage address is not a linkage address that has been previously analyzed, the electronic device 201 determines that the restored linkage address is appropriate, whereas if the restored linkage address is a linkage address that has been previously analyzed, the electronic device 201 determines that the restored linkage address is not appropriate. If the extracted linkage address is appropriate, the related content collecting unit 213 accesses the corresponding linkage address. The related content collecting unit 213 extracts content, such as Internet articles, images and videos, which is linked to the linkage address, and stores the same in the memory 230 such that the extracted content is associated with the social media data that includes the same. The related content collecting unit 213, according to various embodiments of the present disclosure, accesses the content providing server 120 in order to directly extract the related content. In another embodiment, the related content collecting unit 213 stores all of the content contained in the content providing server 130 in a content DB 232 included in the memory 230 and extracts the related content that concerns the corresponding social media data from the memory 230.

According to various embodiments of the present disclosure, the content manager 214 included in the processor 210 provides the collected social media data and the extracted related content to the other electronic device 111 through the topic channel. The content manager 214 classifies the social media data and the related content into each content item and provides the same to the other electronic device 111 through the topic channel. For example, the content manager 214 provides the other electronic device 111 with the content for each piece of social media data, such as videos, images, or news articles, through the topic channel. The content manager 214, according to various embodiments of the present disclosure, provides the social media data and the related content according to the classification above through appropriate viewers. For example, the content manager 214 may: play videos through a video player; play audio data through an audio player; display images through an image viewer; show articles through a web browser; and provide comments through a comment viewer or an integrated viewer. Each viewer consecutively provides the content for the corresponding topic channel through the left and right scrolling. When the feedback for the provided social media data is registered, the content manager 214, according to various embodiments of the present disclosure, forwards the feedback to external social media data corresponding to the provided social media data. For example, the content manager 214 identifies whether or not comments are registered with respect to the social media data (posts on FACEBOOK or TWITTER) that is include in a specific topic channel. When the comments are registered in the social media data, the content manager 214 forwards the comments to external social media data that corresponds to the social media data, i.e., the social media data that is directly posted on the social media server 130 to then be registered. The content manager 214, according to various embodiments of the present disclosure, configures thumbnails that represent the topic channel in the form of images, videos, or text. The content manager 214, according to various embodiments of the present disclosure, provides the other electronic device 111 with a notification on the social media data and the related content, which are newly provided in the topic channel.

The communication module 220, for example, includes a cellular module, a WiFi module, a BLUETOOTH module, a GPS module, an NFC module, or an RF (radio frequency) module.

The cellular module, for example, provides a voice call, a video call, a short message service, or an Internet service through a communication network. According to various embodiments, the cellular module performs identification and authentication of the electronic device 201 in the communication network by using a subscriber identity module (e.g., a SIM card). According to various embodiments, the cellular module performs at least some of the functions that are provided by the processor 210. According to various embodiments, the cellular module includes a communication processor (CP).

Each of the WiFi module, the BLUETOOTH module, the CRS module, or the NFC module, for example, includes a processor that processes data transmitted and received through the corresponding module. According to some embodiments, at least some (e.g., two or more) of the cellular module, the WiFi module, the BLUETOOTH module, the GPS module, or the NFC module is included in a single integrated chip (IC) or IC package.

The RF module, for example, transmits and receives communication signals (e.g., RF signals). The RF module, for example, includes a transceiver, a PAM (power amp module), a frequency filter, an LNA (low noise amplifier), or antennas. According to another embodiment, at least one of the cellular module, the WiFi module, the BLUETOOTH module, the GPS module, or the NFC module transmits and receives RF signals through a separate RF module.

According to various embodiments of the present disclosure, the electronic device 201 receives a keyword list that includes at least one of a basic topic keyword, a topic keyword, or one or more related keywords concerning the topic keyword from the other electronic device 111 through the communication module 220. If the electronic device 201 creates a topic channel by using the keyword list, the other electronic device 111 transmits a request message for the social media data that is collected by using one or more related keywords and the related content that is extracted by analyzing the social media data through the communication module 220. The electronic device 201 receives the request message for the social media data and the related content, which are included in a specific topic channel, through the communication module 220. The electronic device 201, in response to the request message, transmits the social media data and the related content, which are included in the specific topic channel, to the other electronic device 111 through the communication module 220. The other electronic device 111 receives the social media data and the related content of the specific topic channel from the electronic device 201 through the communication module 220. The electronic device 201 transmits content-related information, such as trend information for specific content, to the other electronic device 111 through the communication module 220.

The memory 230 (e.g., the memory 130), for example, includes an internal memory or an external memory. The internal memory, for example, includes at least one of volatile memories {e.g., a DRAM (Dynamic RAM), an SRAM (static RAM), an SDRAM (synchronous dynamic RAM), or the like}, or non-volatile memories {e.g., an OTPROM (one time programmable ROM), a PROM (programmable ROM), an EPROM (erasable and programmable ROM), an EEPROM (electrically erasable and programmable ROM), a mask ROM, a flash ROM, a flash memory (e.g., NAND flash or NOR flash, etc.), a hard drive, a solid-state drive (solid state drive (SSD), or the like}.

The external memory, for example, further includes a flash drive, such as CF (Compact Flash), SD (Secure Digital), Micro-SD (Micro Secure Digital), Mini-SD (Mini Secure Digital), xD (Extreme Digital), an MMC (MultiMediaCard), or a memory Stick. The external memory is functionally and/or physically connected with the electronic device 201 through a variety of interfaces.

According to various embodiments of the present disclosure, the memory 230 includes a social media data DB 231, a content DB 232, and a topic-related information DB 233. The social media data DB 231 stores the social media data that the electronic device 201 collects from various social media servers 130. The content DB 232 stores the content, such as news articles, images, or videos that the electronic device 201 collects from the content providing server 120. The topic-related information DB 233 stores the topic keywords and one or more related keywords concerning the topic keywords. One or more related keywords include search keywords and search-exclusion keywords.

The display 240, for example, includes a liquid crystal display (LCD), a light-emitting diode (LED) display, an organic light-emitting diode (OLED) display, a micro-electro-mechanical system (MEMS) display, or an electronic paper. The display 240, for example, displays a variety of content (e.g., text, images, videos, icons, or symbols) to the user. The display 240 includes a touch screen, and, for example, receives inputs of touches using electronic pens or a part of user's body, gestures, or the hovering. The display 240 includes a panel, a hologram device, or a projector. The panel, for example, is implemented to be flexible, transparent, or wearable. The panel is configured as a single module with the touch panel. The hologram device display three-dimensional images in the air by using interference of light. The projector projects light on a screen to display images. The screen, for example, is located inside or outside the electronic device 201. According to various embodiments, the display further includes a control circuit for controlling the panel, the hologram devices, or the projector.

The display 240, according to various embodiments of the present disclosure, displays the social media data and the related content, which are contained in the topic channel. The display 240 displays trend information for the related content.

The input device 250, for example, includes a touch panel, a (digital) pen sensor, keys, or an ultrasound input device. The touch panel uses at least one of, for example, a capacitive type, a pressure-sensitive type, an infrared type, or an ultrasonic type. The touch panel further includes a control circuit. The touch panel further includes a tactile layer in order to provide tactile reaction to the user.

The (digital) pen sensor, for example, is a part of the touch panel or includes a separate recognition sheet. The keys, for example, include physical buttons, optical keys, or a keypad. The ultrasonic input device detects ultrasonic waves created by an input means through a microphone in order to thereby identify data corresponding to the detected ultrasonic waves.

The input device 250, according to various embodiments of the present disclosure, obtains a basic topic keyword, a topic keyword, or one or more related keywords concerning the topic keyword from the user. The input device 250 receives an input for selecting the social media data included in the topic channel, or an input for selecting the related content included in the topic channel.

Figure 3:
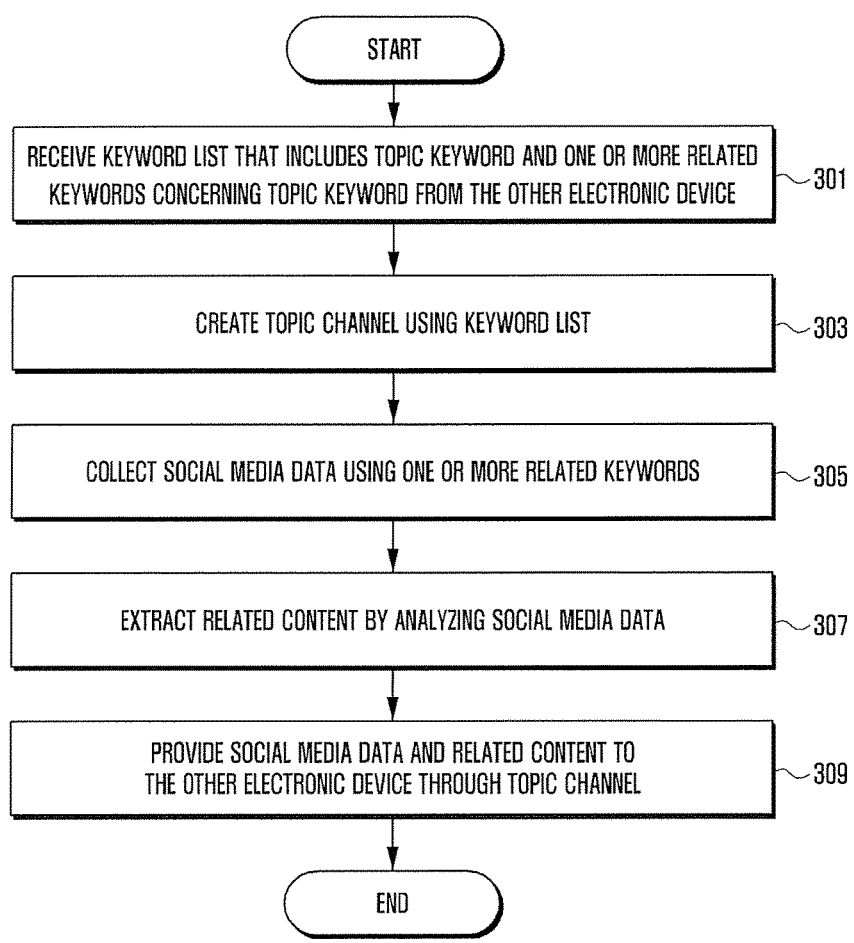
FIG. 3 is a flowchart illustrating the operation in which an electronic device provides social media data and related content to the other electronic device through a topic channel according to various embodiments of the present disclosure.
Figure 4:
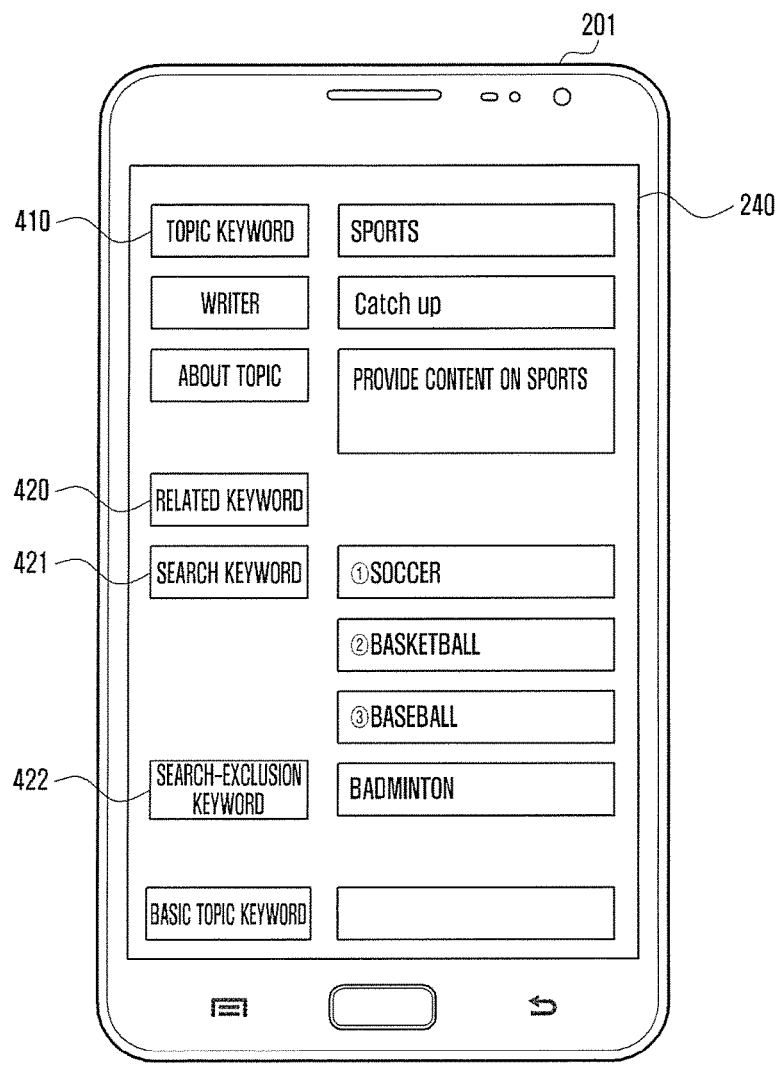
FIG. 4 illustrates an electronic device that displays a keyword list that contains a topic keyword and one or more related keywords concerning the topic keyword, which is received from the other electronic device, according to various embodiments of the present disclosure.
Figure 5:
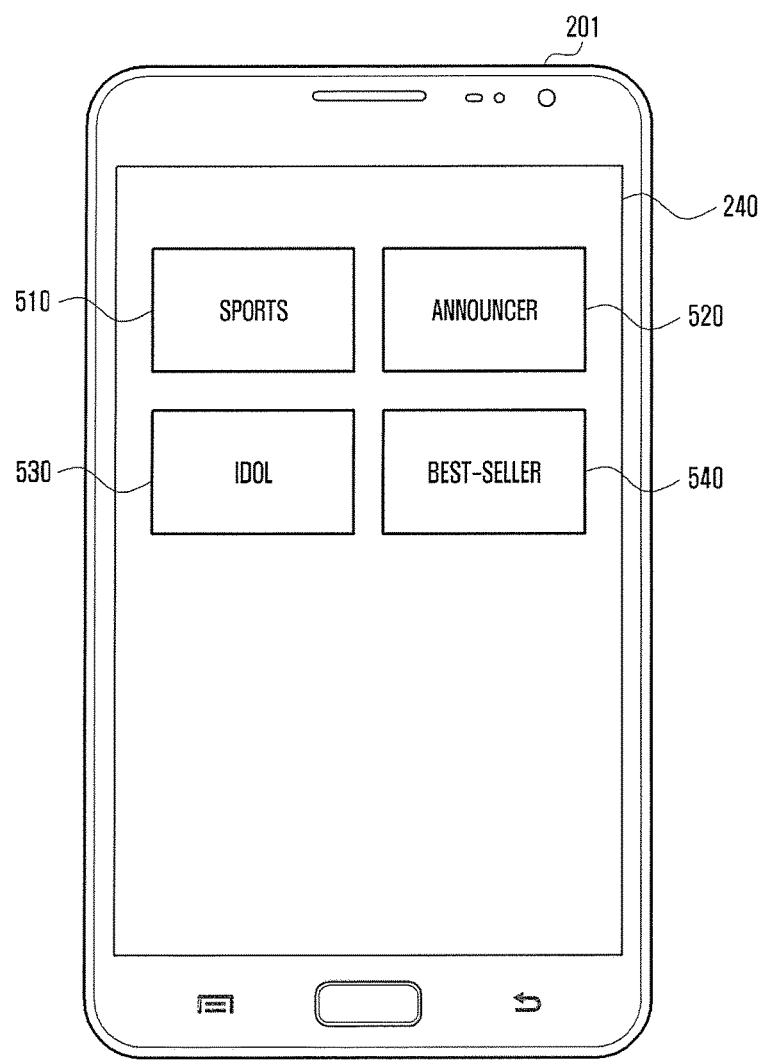
FIG. 5 illustrates an electronic device that displays one or more topic channels that are created by using a keyword list according to various embodiments of the present disclosure.
Figure 6:
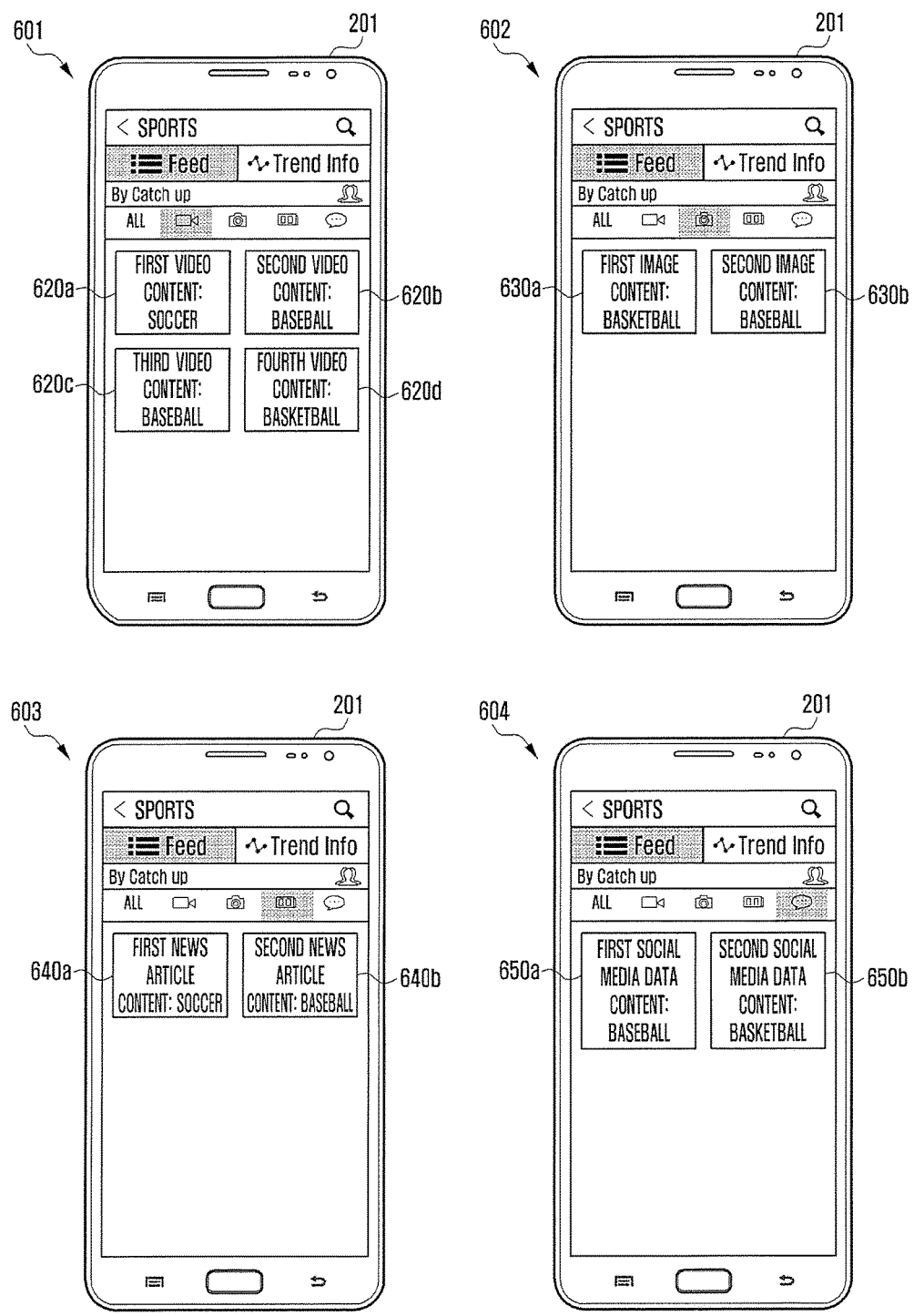
FIG. 6 illustrates an electronic device that displays social media data and related content, which are contained in a topic channel according to various embodiments of the present disclosure.

FIG. 3 is a flowchart illustrating the operation in which the electronic device 201 provides social media data and related content to other electronic devices through the topic channel, according to various embodiments of the present disclosure. The electronic device 201 may constitute the electronic device 101 shown in FIG. 1.

In operation 301, the electronic device 201 receives a keyword list that includes a topic keyword and one or more related keywords concerning the topic keyword from the other electronic device. The topic keyword refers to a keyword that represents a topic of interest to the user and is expressed as one or more nouns. For example, referring to FIG. 4, if the user is interested in a topic of sports and wishes to receive content on sports, the electronic device 201 receives the topic keyword 410 "sports." For another example, if the user is particularly interested in soccer and baseball in sports and wishes to receive content on soccer and baseball, the electronic device 201 receives the topic keyword 410 "soccer and baseball." One or more related keywords 420 are associated with the topic keyword 410 and are used to collect the social media data. One or more related keywords 420 include a search keyword 421 and a search-exclusion keyword 422.

In operation 303, the electronic device 201 creates a topic channel by using the received keyword list. The electronic device 201 creates a topic channel that includes the received topic keyword and related keyword information. For example, referring to FIG. 5, when the electronic device 201 receives the topic keyword "sports," and related keywords "soccer," "basketball," and "baseball," the electronic device 201 creates a sport-topic channel 510, and provides the social media that includes at least one word of soccer, basketball, or baseball and the related content that is extracted from the social media data. For another example, if the electronic device 201 receives the topic keyword "announcer" and related keywords "weather announcer" and "news announcer," the electronic device 201 creates an announcer-topic channel 520 and provides the social media that includes at least one word of the weather announcer or the news announcer and the related content that is extracted from the social media data. Likewise, the electronic device 201 receives the topic keyword "idol" and related keywords concerning the idol from another electronic device to then create an idol-topic channel 530 and provides the social media data related to the idol and the related content to the idle topic channel 530. The electronic device 201 receives the topic keyword "best-seller" and related keywords concerning the same from another electronic device to then create a best-seller-topic channel 540 and provides the social media data related to the best-seller and the related content to the best-seller-topic channel 540.

In operation 305, the electronic device 201 collects social media data by using one or more related keywords. The social media data is posts that are posted to social media services, such as TWITTER, FACEBOOK, or Me2 day, by the users. More specifically, the electronic device 201 collects the social media data by using a search keyword and a search-exclusion keyword, which are contained in one or more related keywords. The electronic device 201 collects the social media data that includes a search keyword 421 among one or more related keywords 420. For example, when the electronic device 201 receives related keywords 420 "soccer," "baseball," and "basketball" of the topic keyword 421 "sports," the electronic device 201 collects the social media data that includes the keyword "soccer," "baseball," or "basketball." The electronic device 201 collects the social media data that does not include a search-exclusion keyword 422 among the one or more related keywords 420. For example, when the electronic device 201 receives a search-exclusion keyword 422 "badminton" that is the related keyword 420 of the topic keyword 410 "sports," the electronic device 201 collects the social media data that does not include the keyword "badminton."

The electronic device 201, according to various embodiments of the present disclosure, accesses the social media server 130 in order to thereby directly collect the social media data concerning the related keywords. In another embodiment, the electronic device 201 stores all of the social media data provided in the social media server 130 in the memory 230 and collects the social media data concerning the related keywords from all of the stored social media data by using a crawling technology. In order to store all of the social media data, the electronic device 201 uses an API (Application Programming Interface) that is provided by a social media service. In addition, in order to store all of the social media data, the electronic device 201 includes an affiliation with the social media server 130 and performs DB-backup or DB-dump from a DB of the corresponding social media server 130.

In operating 307, the electronic device 201 analyzes the collected social media data, and extracts the related content. The related content is the content, such as Internet articles, images, or videos, which are included in the social media data and are extracted from the social media data based on the linkage address (URL). The electronic device 201, according to various embodiments of the present disclosure, extracts linkage address (URL: Uniform Resource Location) information from the collected social media data and restores the linkage address. The electronic device 201 identifies whether or not the restored linkage address is appropriate. More specifically, the electronic device 201 identifies whether or not the restored linkage address is a linkage address that has been previously analyzed. If the restored linkage address is not a linkage address that has been previously analyzed, the electronic device 201 determines that the restored linkage address is appropriate, whereas if the restored linkage address is a linkage address that has been previously analyzed, the electronic device 201 determines that the restored linkage address is not appropriate. This is due to the fact that even different social media data includes the same linkage address information. If the extracted linkage address is not appropriate, the electronic device 201 extracts the linkage address from different social media data to then repeat the operation above. If the extracted linkage address is appropriate, the electronic device 201 accesses the corresponding linkage address. The electronic device 201 extracts the content, such as web pages, or articles, images, and videos of the web pages, which are linked to the linkage address and stores the same in the memory 230 such that the extracted content is associated with the social media data that includes the same.

The electronic device 201, according to various embodiments of the present disclosure, accesses the content providing server 120 in order to directly extract the related content. In another embodiment, the electronic device 201 stores all of the content contained in the content providing server 130 in the content DB 232 included in the memory 230 and extracts the related content concerning the corresponding social media data from the memory 230.

In operation 309, the electronic device 201 provides the collected social media data and the extracted related content to the other electronic device 111 through the related topic channel. The electronic device 201 classifies the social media data and the related content into each content item and provides the same to the other electronic device 111 through the topic channel. For example, referring to FIG. 6, the electronic device 201 receives the topic keyword "sports" and related keywords "soccer," "basketball," and "baseball" from the other electronic device. In this case, the electronic device 201 creates a sport-topic channel and collects the social media data that includes at least one word of soccer, basketball, or baseball. The electronic device 201 accesses the linkage address contained in the collected social media data in order to thereby extract the related content.

The electronic device 201, according to various embodiments of the present disclosure, provides the other electronic device 111 with the content according to the classification of the social media data, such as videos, images, or news articles, through the sport-topic channel. The electronic device 201, as shown in diagram 601, separates the video content to then provide the same to the other electronic device 111 through the sport-topic channel. For example, the electronic device 201 provides the other electronic device 111 with the first video 620a that is extracted from the social media data including "soccer," the second video 620b that is extracted from the social media data including "baseball," the third video 620c that is extracted from the social media data including "baseball," and the fourth video 620d that is extracted from the social media data including "basketball" through the sport-topic channel.

The electronic device 201, according to various embodiments of the present disclosure, separates the image content to then provide the same to the other electronic device 111 through the sport-topic channel, as shown in diagram 602. For example, the electronic device 201 provides the other electronic device 111 with the first image 630a that is extracted from the social media data including "basketball," and the second image 630b that is extracted from the social media data including "baseball" through the sport-topic channel.

The electronic device 201, according to various embodiments of the present disclosure, separate the news article content to then provide the same to the other electronic device 111 through the sport-topic channel, as shown in diagram 603. For example, the electronic device 201 provide the other electronic device 111 with the first news article 640a that is extracted from the social media data including "soccer," and the second news article 640b that is extracted from the social media data including "basketball" through the sport-topic channel.

The electronic device 201, according to various embodiments of the present disclosure, separate the social media data to then provide the same to the other electronic device 111 through the sport-topic channel, as shown in diagram 604. For example, the electronic device 201 provide the other electronic device 111 with the first social media data 650a that includes "baseball," and the second social media data 650b that includes "basketball" through the sport-topic channel. The electronic device 201 sort the related content and the social media data into the order of date or order of popular content rating according to the user's configuration.

The electronic device 201, according to various embodiments of the present disclosure, provides the social media data and the related content according to the classification above through appropriate viewers. For example, the electronic device 201 may: play videos through a video player; play audio data through an audio player; display images through an image viewer; show articles through a web browser; and provide comments through a comment viewer or an integrated viewer. Each viewer consecutively provides the content for the corresponding topic channel through the left and right scrolling.

When the feedback for the provided social media data is registered, the electronic device 201, according to various embodiments of the present disclosure, forward the feedback to external social media data corresponding to the provided social media data. For example, referring to diagram 604 of FIG. 6, the electronic device 201 identify whether or not comments are registered with respect to the first social media data 650a (posts on Facebook or Twitter) that is included in the sport-topic channel. When the comments are registered in the first social media data 650a, the electronic device 201 forward the comments to external social media data that corresponds to the first social media data 650a, i.e., the social media data that is directly posted on the social media server 130 to then be registered.

The electronic device 201, according to various embodiments of the present disclosure, configures thumbnails that represent the topic channels in the form of images, videos, or text. More specifically, the electronic device 201 receives configuration information for the thumbnail representing the corresponding topic channel from the user of the other electronic device 111 and configures the thumbnail based on the configuration information. If the thumbnail configuration information is not received from the user of the other electronic device 111, the electronic device 201 extracts text, or an image or video of the related content from the social media data contained in the topic channel and displays the extracted text, image, or video as the thumbnail.

The electronic device 201, according to various embodiments of the present disclosure, provides the other electronic device 111 with a notification on the social media data and the related content, which are newly provided in the topic channel. The electronic device 201 collects the social media data and the related content for a specific topic channel in a predetermined period, and when other social media content, except for the social media content that has been previously provided, is added, the electronic device 201 provides the notification on the added social media data and the added related content to the other electronic device 111.

The electronic device 201, according to various embodiments of the present disclosure, receives a message that requests the social media data and the related content, which are included in a specific topic channel, from the other electronic device 111. For example, if the user of the other electronic device 111 wishes to view the social media data and the related content of the sport-topic channel, the electronic device 201 receives a request message for the social media data and the related content of the sport-topic channel from the other electronic device 111. The electronic device 201, in response to the request message, transmits the social media data and the related content, which are included in the topic channel. For example, in response to the request message for the social media data and the related content of the sport-topic channel from the other electronic device 111, the electronic device 201 transmits the social media data and the related content, which are included in the sport-topic channel, to the other electronic device 111.

Figure 7:
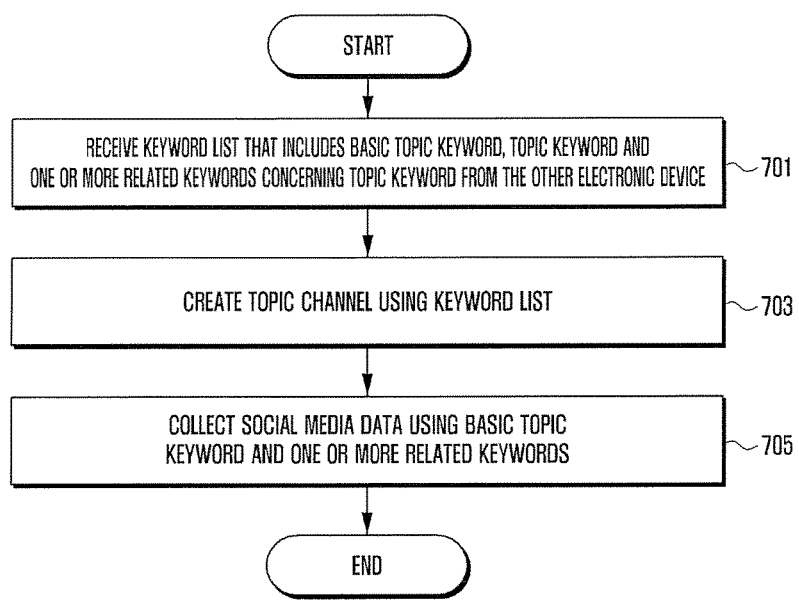
FIG. 7 is a flowchart showing the operation in which an electronic device creates a new topic channel by using an existing topic channel according to various embodiments of the present disclosure.
Figure 8:
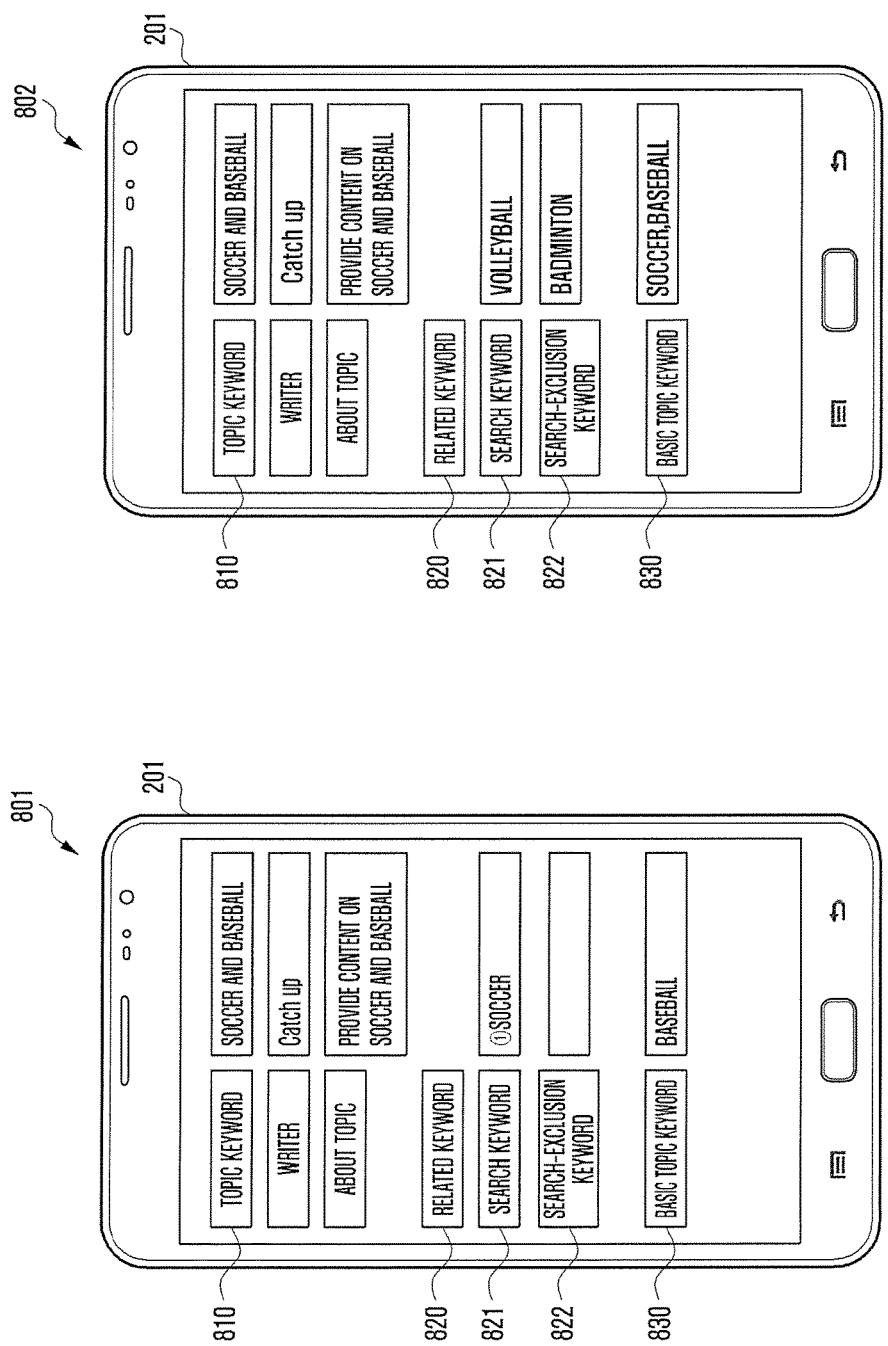
FIG. 8 illustrates an example in which an electronic device creates a new topic channel by using an existing topic channel according to various embodiments of the present disclosure.

FIG. 7 is a flowchart showing the operation in which the electronic device 201 creates a new topic channel by using an existing topic channel, according to various embodiments of the present disclosure.

In operation 701, the electronic device 201 receives a keyword list that includes a basic topic keyword, a topic keyword, and one or more related keywords concerning the topic keyword from the other electronic device. The basic topic keyword is a topic keyword that refers to an existing topic channel that has been created before. For example, if a sport-topic channel corresponding to the topic keyword "sports" has been created before and provides sport-related social media data and related content, the electronic device 201 receives the topic keyword "sports" as the basic topic keyword from the other electronic device. The topic keyword refers to a keyword that represents a topic of interest to the user, and is expressed as one or more nouns. One or more related keywords concern the topic keyword and are used to collect the social media data. One or more related keywords include a search keyword and a search-exclusion keyword. For example, referring to diagram 801 of FIG. 8, the electronic device 201 receives, from the other electronic device, the topic keyword 810 "soccer and baseball," the search keyword 821 "soccer," which is included in the related keyword 820, and the basic topic keyword 830 "baseball." For another example, referring to diagram 802 of FIG. 8, the electronic device 201 receives, from the other electronic device, a keyword list that includes the topic keyword 810 "ball sports," the search keyword 821 "volleyball," which is included in the related keywords 820, the search-exclusion keyword 822 "badminton," which is included in the related keywords 820, and basic topic keywords 830 "soccer" and "baseball."

In operation 703, the electronic device 201 creates a topic channel by using the received keyword list. The electronic device 201 creates a topic channel that corresponds to the received topic keyword. The topic channel includes topic keyword information, related keyword information, or basic topic keyword information. For example, referring to diagram 801 of FIG. 8, the electronic device 201 creates a topic channel of soccer and baseball, which corresponds to the received topic keyword 810 "soccer and baseball." The topic channel of soccer and baseball includes information on the topic keyword 810 "soccer and baseball," information on the search keyword 821 "soccer," and information on the basic topic keyword 830 "baseball." For another example, referring to diagram 802 of FIG. 8, the electronic device 201 creates a topic channel of ball sports, which corresponds to the received topic keyword 810 "ball sports." The topic channel of ball sports includes information on the topic keyword 810 "ball sports," information on the search keyword 821 "volleyball," information on the search-exclusion keyword 822 "badminton," and information on the basic topic keyword 830 "sports." The electronic device 201 creates a new topic channel, based on the existing topic channel. Since the newly created topic channel succeeds to the social media data and the related content of the existing topic channel, the content related to the corresponding topic channel is quickly provided to the user.

In operation 705, the electronic device 201 collects the social media data by using the basic topic keyword and one or more related keywords. More specifically, the created topic channel succeeds to the social media data of the topic channel corresponding to the basic topic keyword. The electronic device 201 further collects the social media data that includes a search keyword, based on the social media data of a basic topic channel. For example, referring to diagram 801 of FIG. 8, the topic channel of soccer and baseball succeeds to the social media data of the baseball-basic topic channel corresponding to the received basic topic keyword 830 "baseball." In other words, since the topic channel of soccer and baseball succeeds to the social media data of the existing topic channel of baseball, it is not necessary to separately collect the social media data including baseball so that the social media data can be quickly collected. Afterwards, the electronic device 201 additionally collects the social media data including the search keyword 821 "soccer."

The electronic device 201 excludes the social media data that contains the search-exclusion keyword from the social media data of the basic topic channel. In addition, the electronic device 201 further collects the social media data that does not include the search-exclusion keyword, based on the social media data in the basic topic channel. For example, referring to diagram 802 of FIG. 8, the ball sport-topic channel succeeds to the social media data of the soccer-basic topic channel corresponding to the soccer-basic topic keyword 830 and the baseball-basic topic channel corresponding to the baseball-basic topic keyword 830. That is, since the ball sport-topic channel succeeds to the social media data of the existing soccer topic channel and the existing baseball topic channel, it is not necessary to separately collect the social media data including "soccer" and "baseball" so that the social media data for ball sports can be quickly collected. Afterwards, the electronic device 201 additionally collects the social media data including the search keyword 821 "volleyball." Furthermore, the electronic device 201 collects the social media data from among the social media data of the soccer-topic channel and the baseball-topic channel as the basic topic channel while excluding the social media data that includes the search-exclusion keyword 822 "badminton." In another embodiment, the electronic device 201 collects the social media data that does not the search-exclusion keyword 822 "badminton" from among the social media data including the search keyword 821 "volleyball." Afterwards, as shown in the operations 307 to 309, the electronic device 201 extracts the related content by analyzing the collected social media data and provides the collected social media data and the extracted related content to the other electronic device 111 through the topic channel.

Figure 9:
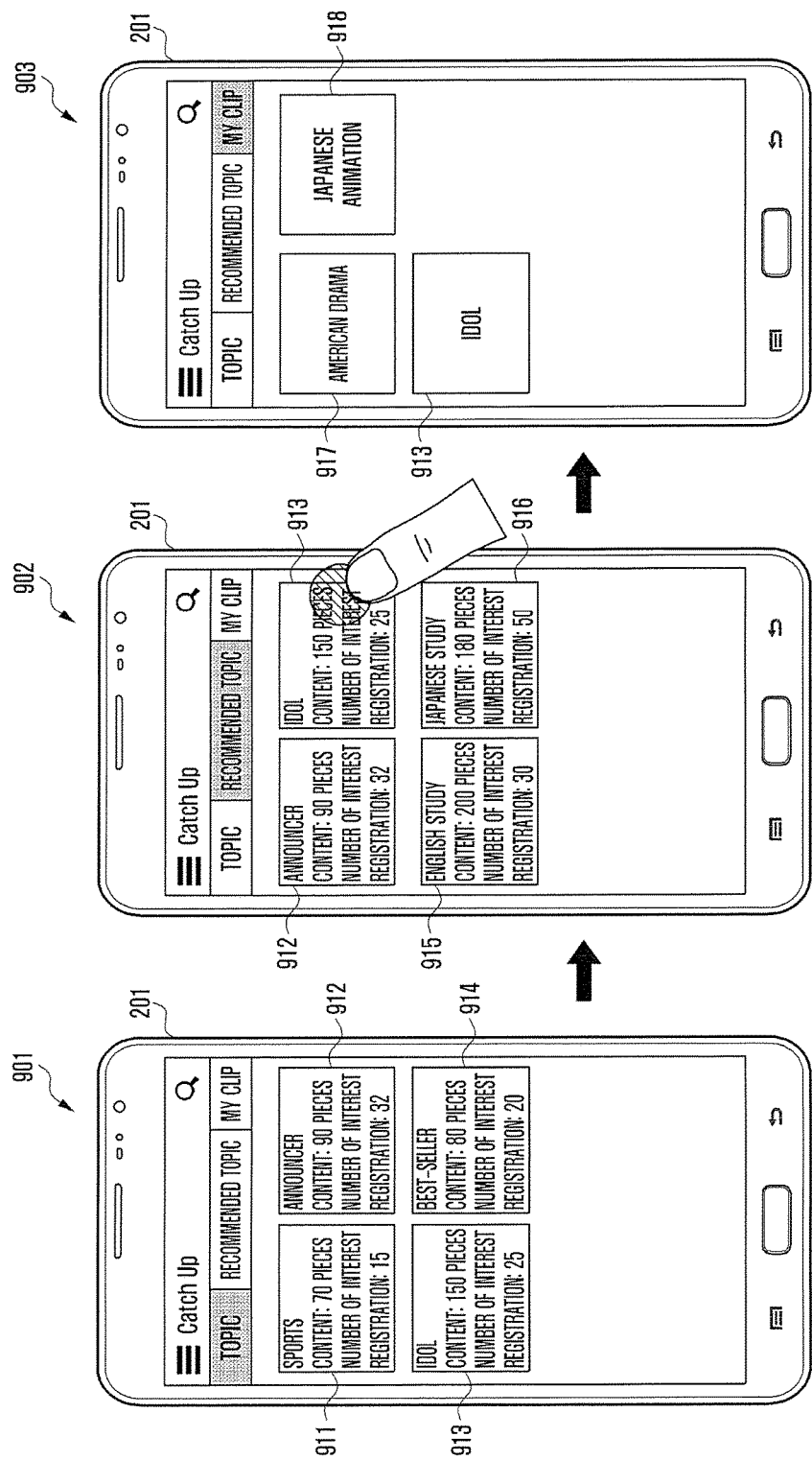
FIG. 9 illustrates an example in which an electronic device provides a recommended topic channel among one or more topic channels according to various embodiments of the present disclosure.

FIG. 9 illustrates an example in which the electronic device 201 provides a recommended topic channel among one or more topic channels, according to various embodiments of the present disclosure. The electronic device 201 analyzes one or more topic channels in order to thereby determine a recommended topic channel. According to various embodiments of the present disclosure, the electronic device 201 identifies the number of pieces of the collected social media data and the related content in each topic channel and determines a topic channel that includes a predetermined number of pieces of content or more as the recommended topic channel. For example, referring to diagram 901 of FIG. 9, in the case where the number of pieces of content to be determined as the recommended topic channel is given one hundred, since an idol-topic channel 913 provides 150 pieces of social media data and related content, the idle-topic channel 913 is determined to be the recommended topic channel. According to various embodiments of the present disclosure, the electronic device 201 identifies the number of times by which each topic channel is registered as an interest-topic channel and determines, as the recommended topic channel, a topic channel, of which the number of times that the topic channel is registered as an interest-topic channel is equal to or more than a predetermined number of times. For example, referring to diagram 901 of FIG. 9, in the case where a predetermined number of times the interest-topic registration to be determined as the recommended topic channel is given thirty times, since an announcer-topic channel 912 has 32 interest-topic registrations, the announcer-topic channel 912 is determined to be the recommended topic channel.

According to various embodiments of the present disclosure, the electronic device 201 provides the determined recommended topic channel to the other electronic device. The electronic device 201 determines a topic channel, which satisfies a given criterion, to be the recommended topic channel. For example, referring to diagram 902 of FIG. 9, the electronic device 201 provides the other electronic device 111 with one or more recommended topic channels that include the announcer-topic channel 912, the idol-topic channel 913, an English-study-topic channel 915, and a Japanese-study-topic channel 916. The user of the other electronic device 111 register the recommended topic channel as his/her interest-topic channel. For example, if the user of the electronic device 111 wishes to view the social media data and the related content of the idle-topic channel 913 as the recommended topic channel, the user registers the idle-topic channel 913 as his/her interest-topic channel. In this case, as shown in diagram 903 of FIG. 9, the recommended topic channel is registered as the interest-topic channel. Therefore, the user of the electronic device 111 easily registers the recommended topic channel as his/her interest-topic channel.

Figure 10:
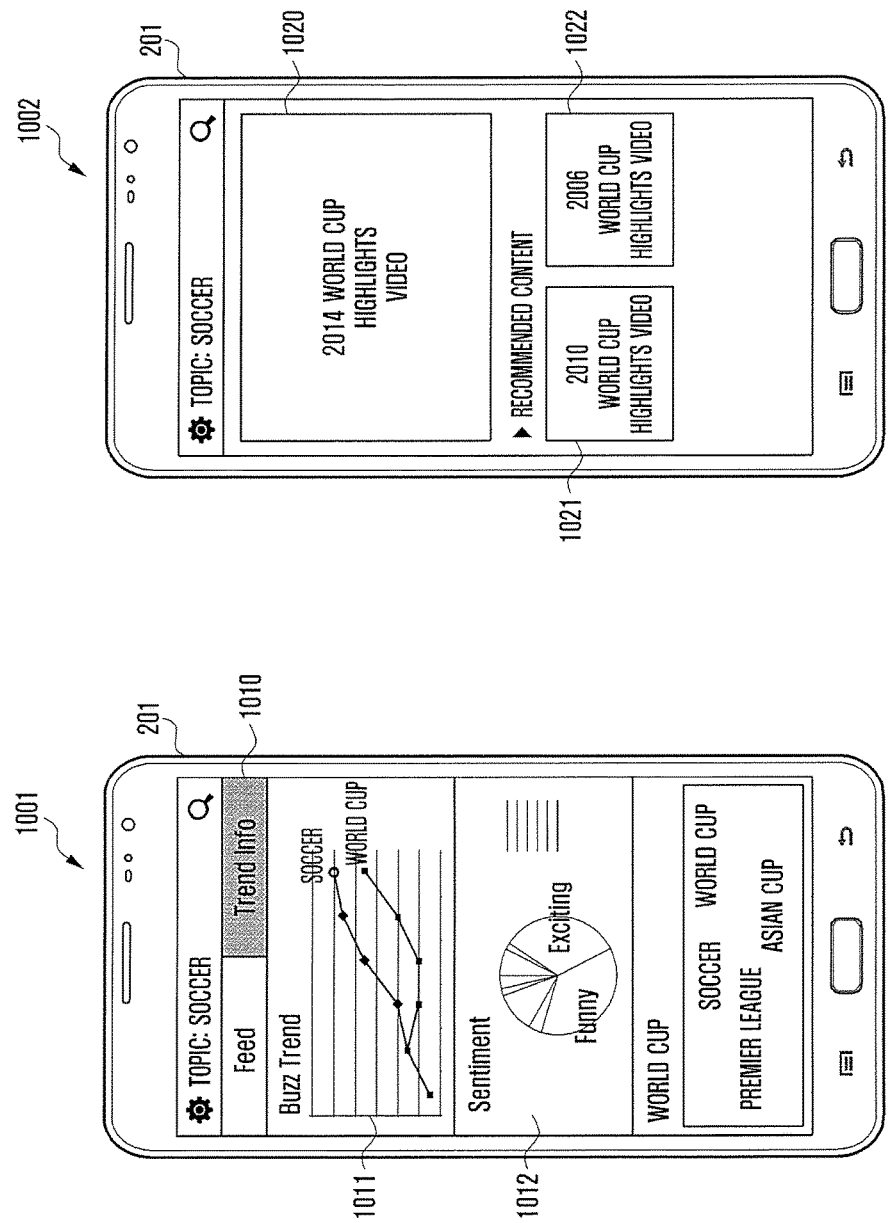
FIG. 10 illustrates an example in which an electronic device provides trend information on content and recommended content according to various embodiments of the present disclosure.

FIG. 10 illustrates an example in which the electronic device 201 provides trend information of the content and the recommended content, according to various embodiments of the present disclosure. The electronic device 201 provides trend information about specific content to the other electronic device. The electronic device 201 analyzes the collected social media data and the extracted related content and provides the trend information on the related content. The electronic device 201 provides the other electronic device with the change status in the trend information about the content depending on time, based on a buzz count. More specifically, the electronic device 201 extract related keywords for a specific topic, and provide the number of search times (buzz number) that the related keywords occur. For example, as shown in diagram 1001 of FIG. 10, the electronic device 201 identifies the number of times the soccer-topic channel is searched or the number of times "World Cup" is searched, which is a related keyword of the soccer-topic channel, and provides the trend information 1010 for the soccer-topic channel and the World Cup-content to the other electronic device 111. In this case, the electronic device 201 provides a graph 1011 of the change status in the trend information depending on time. Furthermore, the electronic device 201 analyzes the content keywords, and provides statistics 1012 by computing opinion information (e.g., opinions of a liking or disliking for the corresponding content) or user's emotion information (e.g., joy, sadness, depression, thanks, pity, etc.) for the corresponding content.

The electronic device 201, according to various embodiments of the present disclosure, provides the recommended content related to the specific content to the other electronic device. The recommended content is content that includes a keyword related to the specific content. The electronic device 201 analyzes the keywords extracted from the specific content in order to thereby provide the recommended content to the other electronic device, and the other electronic device accesses a content providing server that provides the recommended content. For example, as shown in diagram 1002 of FIG. 10, the electronic device 201 provides the other electronic device 111 with a video of highlights on 2010 World Cup 1021 and a video of highlights on 2006 World Cup 1022, which is the recommended content related to a video of highlights on 2014 World Cup 1020 included in the soccer-topic channel. If the video 1021 and the video 1022 are pay videos, the electronic device 111, in order to watch the video 1021 and video 1022, accesses a content providing server that provides the videos and directly moves on to a page for watching or purchasing the videos.

Figure 11:
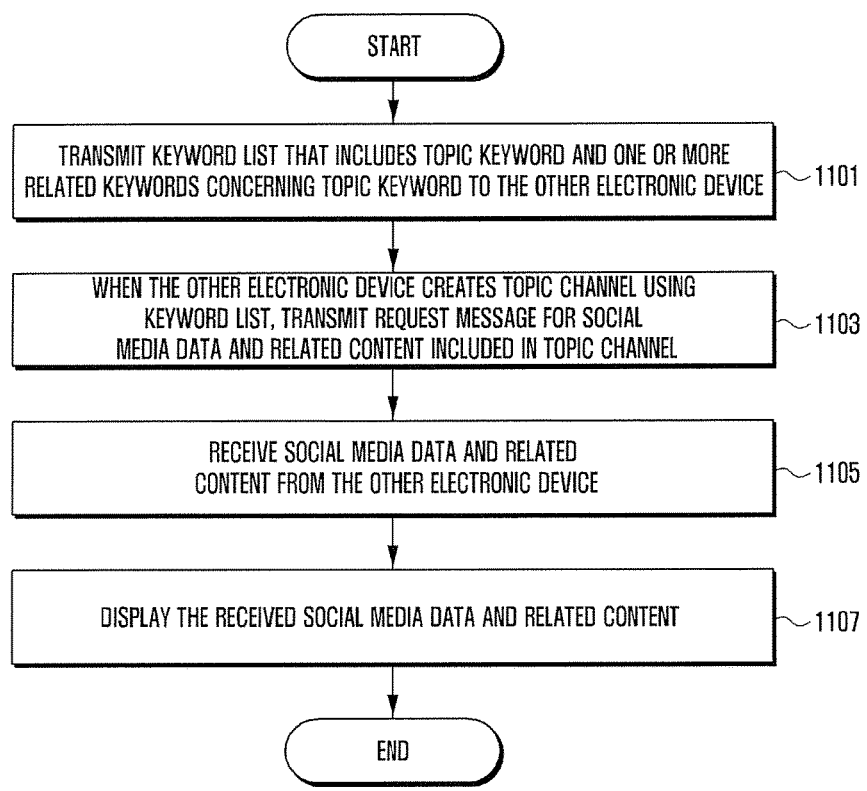
FIG. 11 is a flowchart showing the operation in which an electronic device displays social media data and related content according to various embodiments of the present disclosure.

FIG. 11 is a flowchart showing the operation in which the electronic device 201 displays social media data and related content, according to various embodiments of the present disclosure.

In operation 1101, the electronic device 201 transmits a keyword list that includes a topic keyword and one or more related keywords concerning the topic keyword to the other electronic device 101. The electronic device 201 is one of the electronic devices 111, 112, and 113 shown in FIG. 1. The topic keyword refers to a keyword that represents a topic of interest to the user, and is expressed as one or more nouns. For example, if the user is interested in the topic of sports and wishes to receive the content on sports, the electronic device 201 transmits the topic keyword "sports" to the other electronic device 101. One or more related keywords concern the topic keyword and are used to collect the social media data. One or more related keywords include a search keyword and a search-exclusion keyword.

In operation 1103, when the other electronic device creates a topic channel by using the keyword list, the electronic device 201 transmits a request message for the social media data and the related content contained in the topic channel. For example, the other electronic device 101 receives, as related keywords of the topic keyword "Sport," the search keywords "soccer," "baseball," and "basketball," and the search-exclusion keyword "badminton." In this case, the other electronic device 101 collects the social media data that includes the keyword "soccer," "baseball," or "basketball," and collects the social media data that does not include the keyword "badminton." The other electronic device 101 analyzes the collected social media data in order to thereby extract related content. The related content is the content, such as Internet articles, images, or videos, which are included in the social media data and are extracted from the social media data, based on a linkage address (URL). The other electronic device 101 provides another electronic device 111 with the collected social media data and the extracted related content through a related topic channel. The electronic device 201, in order to receive the social media data and the related content contained in the sport-topic channel, transmits a request message for the social media data and the related content to the other electronic device 101.

In operation 1105, the electronic device 201 receives the social media data and the related content from the other electronic device 101. For example, when the electronic device 201 transmits, to the other electronic device 101, a request message for the social media data and the related content included in the sport-topic channel, the electronic device 201 receives the social media data and the related content included in the sport-topic channel from other electronic device 101.

In operation 1107, the electronic device 201 displays the received social media data and the related content on the display 240. The electronic device 201 classifies the social media data and the related content into each content item. For example, referring to FIG. 6, the electronic device 201 displays the content for each piece of social media data, such as videos, images, or news articles. If the electronic device 201 receives the social media data and the related content for the sport-topic channel, the electronic device 201 separately displays the video content as shown in diagram 601. For example, the electronic device 201 displays, on the display 240, the first video 620*a* that is extracted from the social media data including "soccer," the second video 620*b* that is extracted from the social media data including "baseball," the third video 620*c* that is extracted from the social media data including "baseball," and the fourth video 620*d* that is extracted from the social media data including "basketball."

The electronic device 201, according to various embodiments of the present disclosure, separately displays the image content on the display 240 as shown in diagram 602. For example, the electronic device 201 displays, on the display 240, the first image 630*a* that is extracted from the social media data including "basketball," and the second image 630*b* that is extracted from the social media data including "baseball."

The electronic device 201, according to various embodiments of the present disclosure, separately displays the news article content on the display 240 as shown in diagram 603. For example, the electronic device 201 displays, on the display 240, the first news article 640*a* that is extracted from the social media data including "soccer," and the second news article 640*b* that is extracted from the social media data including "basketball."

The electronic device 201, according to various embodiments of the present disclosure, separately displays the social media data on the display 240 as shown in diagram 604. For example, the electronic device 201 displays, on the display 240, the first social media data 650*a* that includes "baseball," and the second social media data 650*b* that includes "basketball." The electronic device 201 sorts the related content and the social media data into order of date or order of popular content rating according to the user's configuration.

According to various embodiments of the present disclosure, at least some of the devices (for example, modules or functions thereof) or the method (for example, operations) may be implemented by a command stored in a computer-readable storage medium in a programming module form. When the command is executed by one or more processors (for example, the processor 210), the one or more processors may execute a function corresponding to the command. The computer-readable storage medium may be, for example, the memory. At least some of the programming modules may be implemented or executed by, for example, the processor 210. At least some of the programming modules may include, for example, a module, a program, a routine, a set of instructions or a process for performing one or more functions.

The computer readable recording medium may include magnetic media such as, for example, a hard disc, a floppy disc, and a magnetic tape, optical media such as a CD-ROM and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware devices may be configured to operate as one or more software modules in order to perform the operations described in the present disclosure, and vice versa.

The programming module, according to various embodiments the present disclosure, may include one or more of the aforementioned components or may further include other additional components, or some of the aforementioned components may be omitted. Operations executed by a module, a programming module, or other component elements, according to various embodiments of the present disclosure, may be executed sequentially, in parallel, repeatedly, or in a heuristic manner. Further, some operations may be executed according to another order or may be omitted, or other operations may be added.

While the disclosure has been shown and described with reference to certain embodiments thereof, it will be understood by those skilled in the art that various changes in form and detail may be made therein without departing from the spirit and scope of the disclosure as defined by the appended claims, and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a memory configured to store a plurality of topic channels and related content associated with each of the plurality of topic channels;
   a display;
   a communication module configured to receive a keyword list that includes a topic keyword and one or more related keywords concerning the topic keyword from an external electronic device; and
   a hardware processor configured to:
      create, by using the keyword list, a topic channel including data related to a subject of keywords included in the keyword list,
      control the communication module to receive social media data by using the one or more related keywords,
      extract the related content by analyzing the social media data,
      control the communication module to transmit the social media data and the related content in the topic channel to the external electronic device,
      control the display to display the social media data and the related content in the topic channel,
      determine whether a topic channel associated with the created topic channel exists among the plurality of topic channels based on the keyword list,
      in response to determining that the topic channel associated with the created topic channel exists, control the communication module to transmit the social media data and the related content in the topic channel associated with the created topic channel to the external electronic device, identify a number of social media data and the related content in each of the plurality of topic channels, and determine at least one topic channel as a recommended topic channel among the plurality of topic channels based on a determination that the identified number of social media data and the related content is more than a predetermined number.

2. The electronic device of claim 1, wherein the one or more related keywords include a search keyword and a search-exclusion keyword.

3. The electronic device of claim 1, wherein the hardware processor is configured to receive the social media data that includes a search keyword among the one or more related keywords.

4. The electronic device of claim 3, wherein the hardware processor is configured to receive the social media data that does not include a search-exclusion keyword among the one or more related keywords.

5. The electronic device of claim 1, wherein the communication module is configured to receive the keyword list that further includes a basic topic keyword, and the hardware processor is configured to receive the social media data by using the basic topic keyword and the one or more related keywords.

6. The electronic device of claim 1, wherein the hardware processor is further configured to:

extract a linkage address (URL) contained in the social media data, and extract a web page that is linked to the linkage address, and articles, images, or videos, that are contained in the web page.

7. The electronic device of claim 1, wherein the communication module is further configured to:

receive a request message for the social media data and the related content that are included in the topic channel, and transmit, in response to the request message, the social media data and the related content that are included in the topic channel.

8. The electronic device of claim 1, wherein the memory is further configured to store the social media data.

9. The electronic device of claim 1, wherein the hardware processor is further configured to:

analyze one or more topic channels in order to determine the recommended topic channel, and provide the recommended topic channel.

10. The electronic device of claim 1, wherein the hardware processor is further configured to analyze the collected social media data and the extracted related content in order to provide trend information on the related content.

11. The electronic device of claim 1, wherein the communication module is further configured to forward, when feedback for the provided social media data is registered, the feedback to external social media data corresponding to the provided social media data.

12. A method for providing social media content, the method comprising:

receiving a keyword list that includes a topic keyword and one or more related keywords concerning the topic keyword from an external electronic device;

creating a topic channel including data related to a subject of keywords included in the keyword list by using the keyword list;

receiving social media data by using the one or more related keywords;

extracting related content by analyzing the social media data;

transmitting the social media data and the related content in the topic channel, determining whether a topic channel associated with the created topic channel exists among a plurality of topic channels based on the keyword list, in response to determining that the topic channel associated with the created topic channel exists, transmitting the social media data and the related content in the topic channel associated with the created topic channel to the external electronic device, identifying a number of social media data and the related content in each of the plurality of topic channels; and determining at least one topic channel as a recommended topic channel among the plurality of topic channels based on a determination that the identified number of social media data and the related content is more than a predetermined number.

13. The method of claim 12, wherein the one or more related keywords include a search keyword and a search-exclusion keyword.

14. The method of claim 12, wherein receiving the social media data comprises receiving the social media data that includes a search keyword among the one or more related keywords.

15. The method of claim 14, wherein receiving the social media data comprises receiving the social media data that does not include a search-exclusion keyword among the one or more related keywords.

16. The method of claim 12, wherein receiving the social media data comprises:

receiving the keyword list that further includes a basic topic keyword; and receiving the social media data by using the basic topic keyword and the one or more related keywords.

17. The method of claim 12, wherein extracting the related content comprises:

extracting a linkage address (URL) contained in the social media data; and extracting a web page that is linked to the linkage address, and articles, images, or videos, that are contained in the web page.

18. The method of claim 12, further comprising:

receiving a request message for the social media data and the related content that are included in the topic channel; and in response to the request message, transmitting the social media data and the related content that are included in the topic channel.

19. The method of claim 12, further comprising storing the social media data and the related content.

20. The method of claim 12, further comprising:

analyzing one or more topic channels in order to determine the recommended topic channel; and providing the recommended topic channel.

21. The method of claim 12, further comprising analyzing the collected social media data and the extracted related content in order to provide trend information on the related content.

22. The method of claim 12, further comprising, when feedback for the provided social media data is registered, forwarding the feedback to external social media data corresponding to the provided social media data.

\* \* \* \* \*